United States Patent Office.

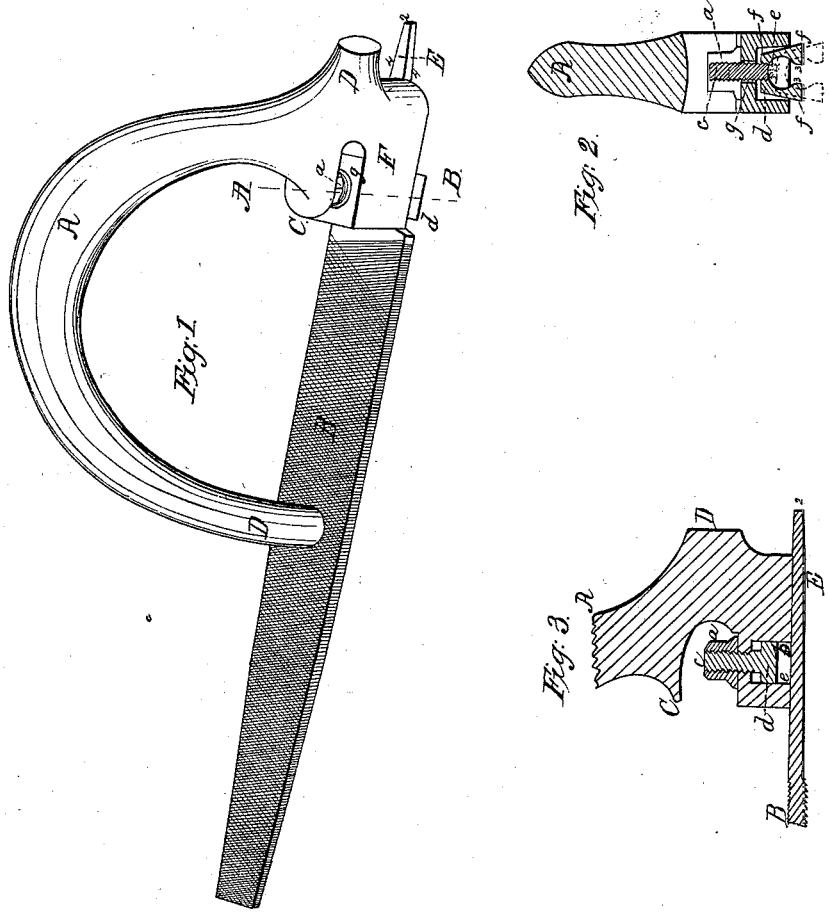

JOSEPH WEARE, OF FITCHBURG, MASSACHUSETTS.

Letters Patent No. 79,709, dated July 7, 1868.

---

IMPROVEMENT IN SURFACE-FILE HANDLE.

---

The Schedule referred to in these Letters Patent and making part of the same.

---

KNOW ALL MEN BY THESE PRESENTS:

That I, JOSEPH WEARE, of Fitchburg, in the county of Worcester, and Commonwealth of Massachusetts, have invented certain new and useful Improvements in Surface-File Handles; and I do hereby declare that the following is a full, clear, and exact description of the same, reference being had to the accompanying drawings, forming a part of this specification, in which—

Figure 1 represents a perspective view of my improved surface-file handle when applied for, and Figure 2 represents a vertical section through the rear of the handle, and a central section through the file-shank-holding device on line A B, fig. 1.

Figure 3 represents a longitudinal central section of the rear part of the shank of the file and holding-devices, as shown in fig. 1.

To enable those skilled in the art to which my invention belongs to make and use the same, I will proceed to describe it more in detail.

In the drawings, the part lettered A represents that part of the file-handle which is grasped by the hand when the file B is used. The rear lower end of the part A has an inner projection, C, and an outer projection, D, both of which serve to support the hand, and prevent it from slipping down upon the shank E of the file and the holding-nut a, when the file is used. In the bottom projection F of the part A is a recess, b, a hole being bored or drilled from the top of the recess through the top of the projection F, through which the screw-end, c, of the clamp d, is passed. Clamp d is recessed out, as seen at e, and has two jaws, f f, which flare or diverge out, as indicated in fig. 2 of the drawings.

The operation is as follows: The screw-end c of the clamp or holding-device d is passed through recess b, and up through the hole in the top, g, of the part F, as shown in red lines, when a nut, a, is applied, and clamp, d, drawn into the recess until its jaws f f strike the sides 1 1 of the recess b, as indicated in dark lines, fig. 2, after which the end, 2, of the shank E of the file is passed through between the jaws f f, until the inclined sides of the file-shank bind against the edges 3 3 of the jaws f f, after which nut a is turned down upon the screw part or shank c of the clamp d, by which operation the edges 3 3 of the jaws f f are forced against the edges 4 4 of the shank E of the file, in consequence of the outer inclined sides h h of the jaws f f being drawn against the sides 1 1 of the slot b, with such force, by the turning down of the nut a, as to spring the jaws f f towards each other sufficiently to cause them to close upon the shank of the file with a vise-like gripe or hold. The jaws f f are made to open slightly tapering, that is, the front part of the edges 3 3 are a little further apart than the rear parts of the edges, whereby they fit the tapering shanks of files more perfectly than if made to open parallel, or with parallel edges. The under or lower side or face of the part F is smooth, and against which the side of the shank of the file rests, or is held by the jaws f f.

In fig. 2, a file is shown attached to my improved handle for use in surface-filing, and it will be noticed that the front curved end, I, rests upon the file, forward of the point of attachment of the shank of the handle, and that the projections C and D are in their proper positions to support the hand in an easy manner, while at the same time protecting it from injury, or from being scratched by either nut a or the shank E of the file.

My improved handle may be applied in a very easy and quick manner to files having different-sized shanks, and that, too, without the necessity of making any change in the form or shape of the file-shank. This is an important feature, and one, too, which all mechanics will readily appreciate.

Then, again, the form of the handle is such that both hands can be used to press the file to its work, a part of the force being applied to the body of the file, which insures better and more perfect work, while at the same time lessening the strain of the shank.

It will be apparent that the clamping-device may be made somewhat differently without departing from the principle of my invention.

Having described my improved surface-file handle, what I claim therein as new and of my invention, and desire to secure by Letters Patent, is—

1. A surface-file handle, composed of the bent or curved handle A F I, in combination with a clamping-device for grasping the file-shank in the manner described, so that the bent part I of the handle shall rest or bear upon the file in front of the point at which the handle is attached to the file, as and for the purposes set forth.

2. The combination of the base, F, of the curved handle, and the clamp and its adjusting or tightening-screw and nut held in said base, and covered by the horn or projection C, the said parts being constructed and arranged to operate as herein shown and specified.

JOSEPH WEARE.

Witnesses:
    JAMES M. WOODBURY,
    CALVIN A. FOSTER.